Figure 1:
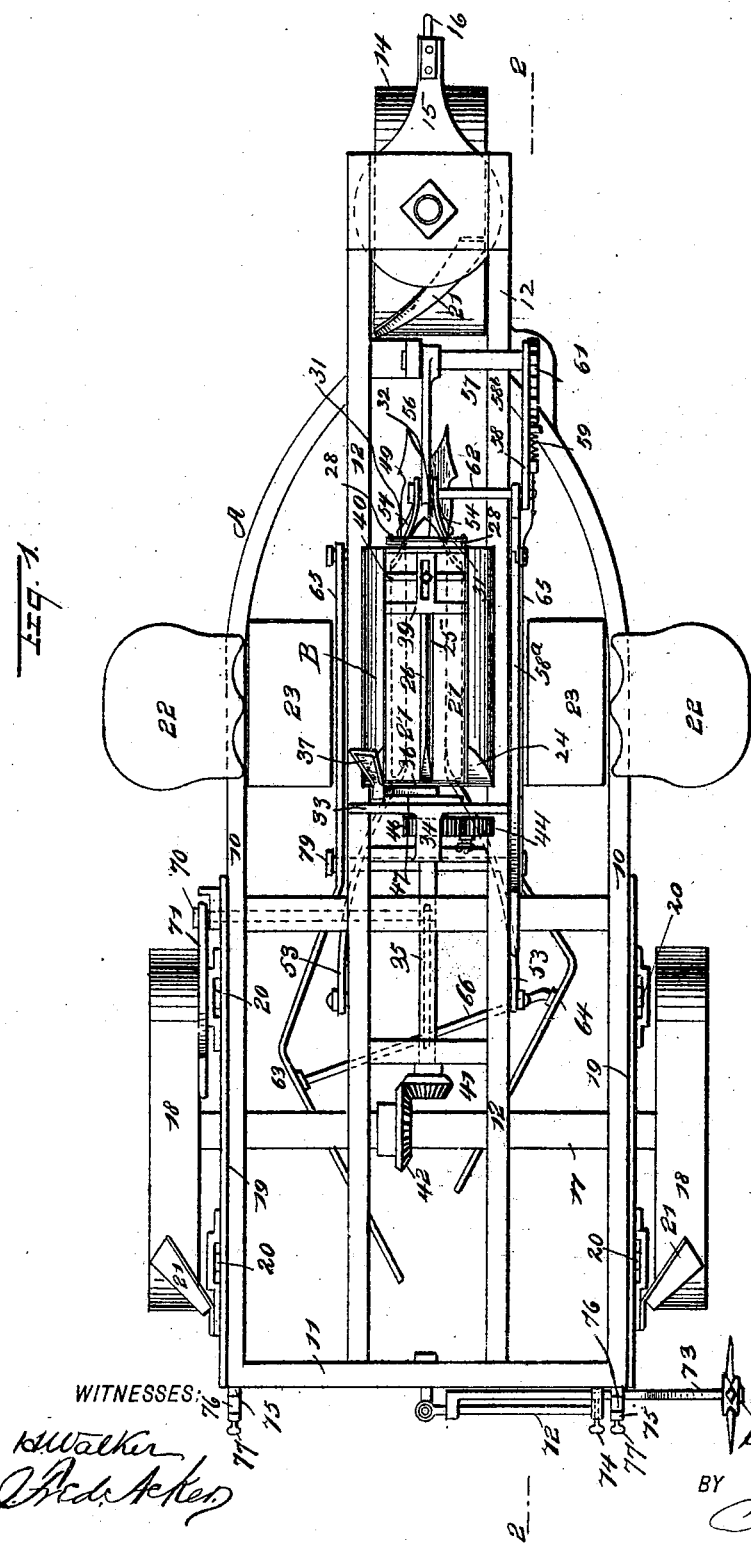

(No Model.) 3 Sheets—Sheet 1.

ANTONIO MARTIN RIVERO Y AGUIAR.
CANE PLANTER.

No. 552,449. Patented Dec. 31, 1895.

(No Model.) 3 Sheets—Sheet 3.
ANTONIO MARTIN RIVERO Y AGUIAR.
CANE PLANTER.
No. 552,449. Patented Dec. 31, 1895.
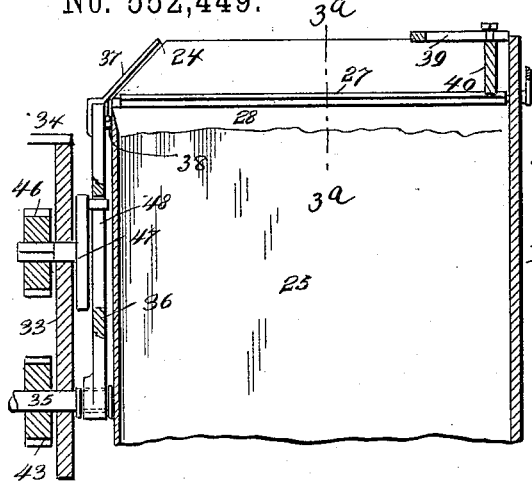
Fig. 3.
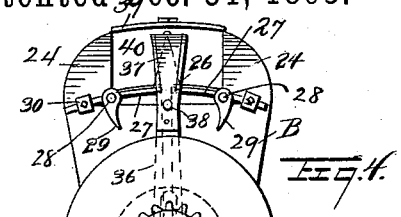
Fig. 4.
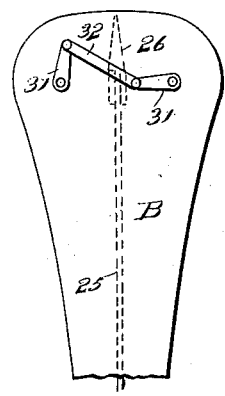
Fig. 5.
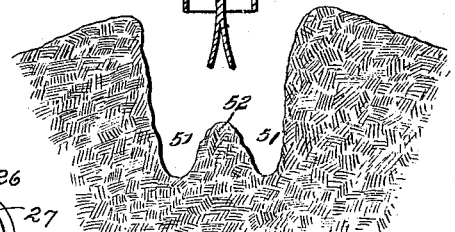
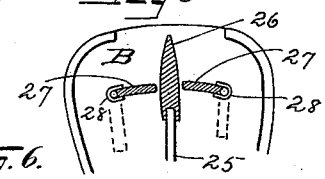
Fig. 3a.
Fig. 6.  Fig. 7.
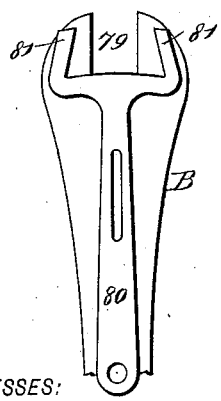
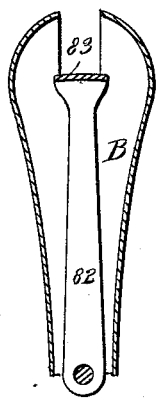
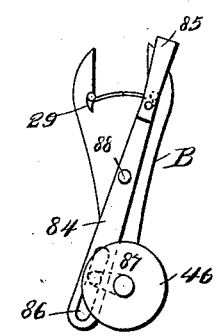
Fig. 8.
WITNESSES:
H. Walker
J. Fred Acker
INVENTOR
A. M. Rivero y Aguiar
BY Munn & Co
ATTORNEYS.
ANDREW B. GRAHAM, PHOTO-LITHO. WASHINGTON, D.C.

UNITED STATES PATENT OFFICE.

ANTONIO MARTIN RIVERO Y AGUIAR, OF HAVANA, CUBA.

CANE-PLANTER.

SPECIFICATION forming part of Letters Patent No. 552,449, dated December 31, 1895.

Application filed September 4, 1894. Serial No. 522,110. (No model.)

*To all whom it may concern:*

Be it known that I, ANTONIO MARTIN RIVERO Y AGUIAR, of Havana, Cuba, have invented a new and Improved Cane-Planter, of which the following is a full, clear, and exact description.

My invention relates to an improvement in cane-planters; and the object of the invention is to provide a means whereby a furrow may be opened in which the cane is to be planted, the operator being enabled to make a furrow of different depth, as may be required, either of the usual shape or with a transverse section similar in shape to a letter W whose exterior sides are longer than the middle, whereby in connection with an appropriate dropping device two pieces of cane may be simultaneously planted parallel without touching each other.

A further object of the invention is to provide for carrying a sufficient quantity of cane to serve for planting a predetermined area of ground, and to cut the cane in equal lengths, and for being able to vary the length of the cane cut without necessitating dismounting or changing the parts of the apparatus.

A further object of the invention is to permit the piece or pieces of cane to drop horizontally into the furrow at regular distances, which may be varied at will.

Another object of the invention is to provide a novel means for covering the cane when planted, and to provide for raising and lowering the plow and coverer independently or together, as occasion may demand, and, furthermore, to provide cleaning devices for the wheels which will prevent them from becoming clogged by earth, weeds, or grass that may adhere to them, and likewise prevent the accumulation of grass and weeds at the wheels from interfering with the action of the cutting and planting devices by serving as a drag to the machine.

A further object of the invention is to provide a marking device capable of being readily shifted from side to side of the machine, and which will be simple and durable in its construction.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 2:
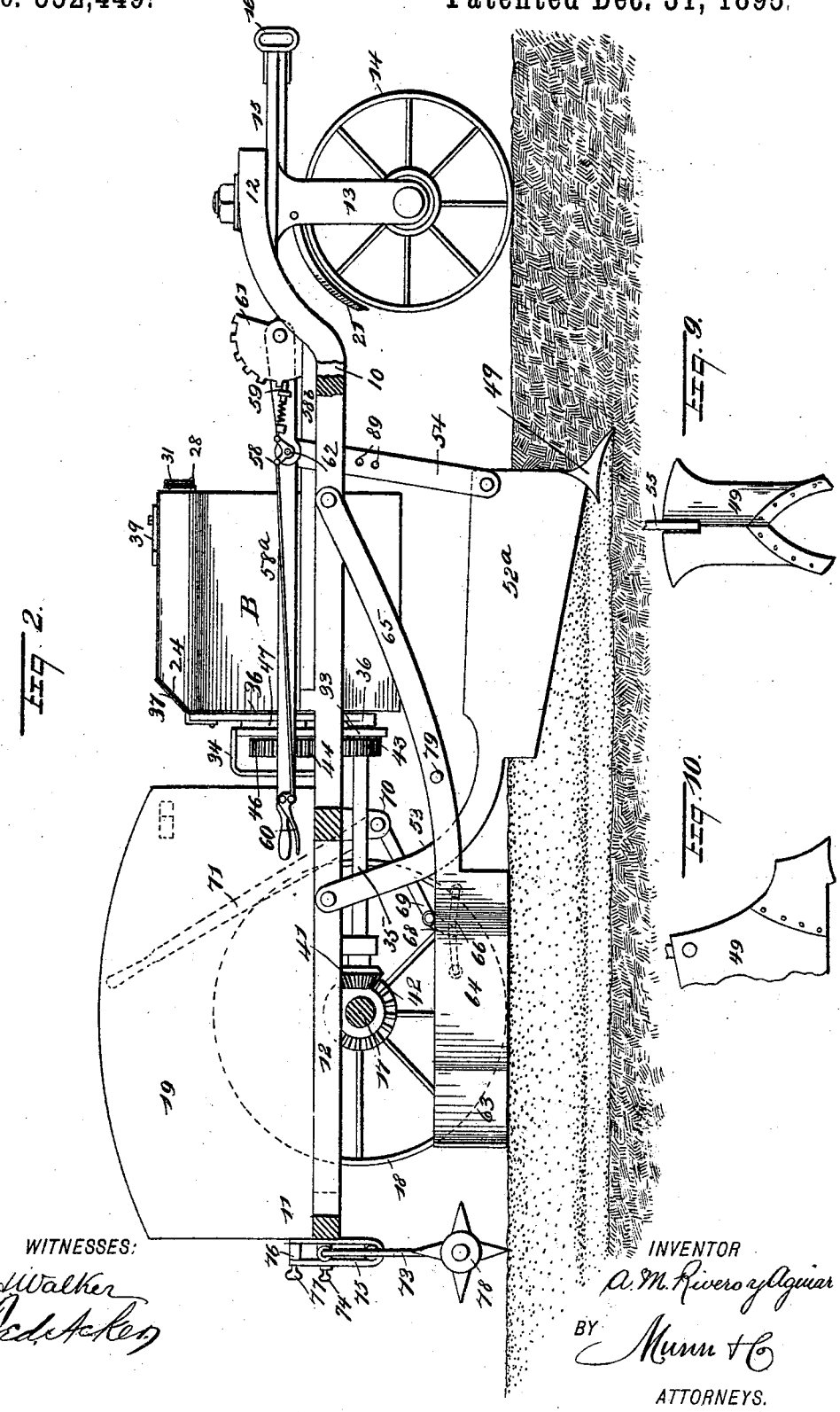

Figure 1 is a plan view of the machine. Fig. 2 is a longitudinal vertical section taken essentially on the line 2 2 of Fig. 1. Fig. 3 is a detail vertical section through the planting-box. Fig. $3^a$ is a detail vertical section through the box at right angles to the plane of the section in Fig. 3, along line $3^a$ $3^a$ in said figure. Fig. 4 is a rear elevation of the box. Fig. 5 is a front elevation thereof. Figs. 6 and 7 are respectively a rear elevation and an inner face view of the front end of a modified form of planting-box. Fig. 8 is an elevation of the rear end of a planting-box, illustrating another manner of manipulating the cutter. Fig. 9 is a plan view of one form of plow employed, and Fig. 10 is a side elevation of the plow attached to a fender forming a rear extension of the plow.

In carrying out the invention the frame A of the machine may be said to consist of side beams 10, connected by a rear beam 11, the rear beam being straight and the forward portions of the side beams curved in direction of one another to meet intermediate beams 12, which extend from the rear beam 11 beyond the forward extremities of the side beams, and the extensions of the intermediate beams 12 are arched, as shown in Fig. 2, and may be provided with pedestals or hangers 13, extending downward therefrom, forming a bearing for the axle of a single forward wheel 14. The hangers or pedestals are preferably independent of the frame proper, being attached to a tongue 15, which has pivotal connection with the frame, and the tongue is made to terminate in a clevis 16 for attachment to a team.

At the rear portion of the frame an axle 17 is suitably journaled, carrying a ground-wheel 18 at each end, and although I have illustrated the frame as supported by three wheels it will be understood that a greater or a lesser number may be used.

The rear portion of the frame is so constructed as to form a bed for a quantity of cane, and to that end side boards 19 are removably placed upon the sides of the said rear portion of the frame, as shown in Figs. 1 and 2, the frame carrying suitable standards 20 to be passed through sockets in said side boards. In order that the wheels of the machine shall not be choked by weeds or foreign matter liable to adhere thereto, both of the rear wheels and the front wheel are provided with scrapers 21. These scrapers are secured at one end to the frame, and extend diagonally over and in contact with the periphery of the wheels, striking the said peripheries at an angle more or less acute, and the front faces of the scrapers are so curved that they will readily discharge any material taken up by the wheels out of the path of the latter.

Near the forward portion of the frame a seat 22 is located at each side, a suitable footrest 23 being provided for each seat, as shown in Fig. 1, and between these two seats, which are preferably opposite each other, a planting or seed-dropping box B is erected, ordinarily upon the central beams 12 of the frame. This box may be of any desired shape, but ordinarily it is rectangular in general contour. It is open at the bottom and is inclined forwardly at its rear end, whereby the upper portion of the rear of the box is beveled, as shown at 24 in the drawings. This box is divided into two compartments by preferably a central partition 25, and this partition is removably secured in the box, the upper portion of the partition, which is usually carried to the top of the box proper, being beveled upon opposite sides, as shown at 26 in the drawings, especially in Fig. 5, and the rear end of the upper portion of this partition is beveled to correspond to the beveled surfaces 24 of the box proper.

Each compartment in the box is normally closed at the top through the medium of a door 27, as seen in Fig. 3ª. These doors extend from end to end of the compartment, and are located a predetermined distance from the top, ordinarily just where the inclination at the top commences, as shown in Fig. 3. The doors are adapted to drop, and each door is secured in any approved manner to a shaft 28, which extends through the box B from one end to the other, as shown in Figs. 3, 4, and 5.

At the rear end of the box each shaft has secured upon it a finger 29, the fingers being located outside of the box, as shown in Fig. 4, and each finger is fitted with a counterbalance-weight 30, of sufficient size or density (or springs having force enough) to maintain the door or platform 27 with which it is connected in a closed or substantially horizontal position, as shown in the said Fig. 4. Preferably the doors are somewhat arched in cross-section in order that they may present a somewhat circular upper face to receive the cane.

At the forward or opposite end of each door or platform shaft a crank-arm 31 is secured, and the two crank-arms are connected by a link 32, as illustrated in Fig. 5, whereby when one of the doors is dropped by, for example, forcing outwardly the finger 29 connected with it the other door will simultaneously assume a like position, causing whatever material that has been placed upon the doors to drop down into the compartments of the box; and it may here be remarked that in the construction of this box it is ordinarily made tapering, as shown in Fig. 4, being narrowest at its lower end, and the central partition 25 is generally carried beyond the lower end of the box proper, and is forked, since it is intended to direct the cane dropped by the doors into a furrow, one piece at each side of the central ridge.

A plate or partition 33 is supported in a vertical position immediately at the rear of the rear end of the planting or dropping box B, the said plate having attached to or integral with it a bracket 34, or its equivalent, which in its turn is attached to the frame of the machine, as shown in Fig. 1.

A shaft 35 is carried longitudinally of the frame and is supported in suitable hangers attached to the frame; but one end of the shaft is usually carried through the plate or partition 34, turning loosely therein, and this forword end of the shaft is collared, or fitted to receive an arm 36, the said arm turning loosely at its lower end on said shaft, as shown in Fig. 3. At the upper end of this arm a knife 37 is firmly secured in any known manner, the knife being given an inclination corresponding to that of the rear end surfaces 24 of the box, as is likewise shown in Fig. 3, whereby when the arm 36 is rapidly reciprocated or rocked on the shaft 35 it will pass the openings at each side of the partition 25 in the planting-box, and whatever cane may be inserted into the said openings and made to rest upon the doors or platforms 27 will be cut by the knife in suitable lengths, the knife when passing in one direction cutting the cane in one opening at the central partition, and cutting the cane in the other opening at the outer wall of that compartment, a reverse action taking place on the return of the knife. In this manner two persons may readily feed this machine by placing the cane in the openings or compartments upon the platforms or doors, and said feeding may be accomplished not only expeditiously and conveniently but with perfect safety to the operator.

The shank of the knife, on the upper end of the reciprocating arm 36, is provided with a pin 38, extending outwardly therefrom; and as the knife is reciprocated from side to side of the box the pin will strike one or the other of the fingers 29 after it has cut the cane in the corresponding compartment, and thereby open the door or platform and permit the cane to drop.

It is sometimes desired to cut the cane into short lengths, say of two or three joints, and at other times into longer lengths, and in order to facilitate the operation of the machine I provide an adjustable gage against which the operator may hold the end of the cane.

In its preferred form this gage consists, as shown in Figs. 1 and 3, of a bracket arranged across the top of the box B and provided with a guideway 39, along which plays the stem of a clamp-screw the top of which screws into the follower or stop 40, having a suitable opening to receive the enlarged head 26 of partition 25 and adapted to be adjusted longitudinally of the box. I do not wish to limit myself to this particular construction of the gage, however, as it is evident that other forms may be employed.

The shaft 35 is driven from the axle by locating upon its rear end, for example, a beveled pinion 41, which meshes with a like gear 42, secured on the axle, and suitable means may be employed for throwing the gear 42 in and out of mesh with the pinion. At the forward end of the shaft 35 a gear 43 is securely mounted thereon, which gear is in mesh with a larger gear 44, adjustably mounted in the plate or partition 33, the trunnions or spindle upon which the gear is mounted being held to slide (for example) in a segmental slot 45, made in said plate, and the larger gear 44 meshes with an upper gear 46, and upon the same shaft with the gear 46 a crank-disk 47 is mounted, located forward of the plate 33, between said plate and the reciprocating knife-arm 36, the pin of the crank-disk being made to enter a slot 48 in the arm and thus give movement to the latter.

Sometimes the cane is to be dropped so that it will lie in its furrow end to end, and at other times it is desirable that a space of more or less length shall occur between the pieces of cane. This is accomplished by changing the speed of the gearing. Therefore the upper gear 46 is made removable and the intermediate gear 44 adjustable to and from the upper gear, in order that it may be accommodated to the size of the latter.

The furrow-plow 49 is shown in detail in Figs. 9 and 10, in which it will be observed that the upper portion of the plow is open, and the said plow in cross-section is angular, the front presenting a shape substantially like that of an inverted V. Thus in plowing a furrow similar to that shown in Fig. 4 will be produced, in which a trough 51 is formed at each side of a central rib 52. The plowshare just described has attached to each of its sides at the rear a fender 52ª, and the lower end of this fender is preferably inclined in an upward and rearward direction from its front, as shown in Fig. 2, in which the plow proper is shown quite small.

Each fender is provided with a rearwardly and upwardly curved extension-arm 53, pivoted in any suitable or approved manner to the longitudinal central beams 12 of the frame. The plow is lifted from the ground or carried downward to enter the ground as deeply as may be desired either through the medium of two links 54, as shown in Fig. 1, attached to the upper forward portion of the fenders, or through the medium of a link 55, (shown in Fig. 9,) attached to the upper portion of the plow 49. In either event the links are pivotally connected with an arm 56, which is projected from a rock-shaft 57, journaled in the forward part of the frame and operated by a lever 58. The upper portion of the plow is concaved, and the fenders meet and are secured together at the top of the plow and form a continuation of the said concavity.

The lever 58 is preferably an articulated lever, comprising a handle-section 58ª and a body-section 58ᵇ, the body-section being provided with a latch 59, operated by a thumb-lever 60, carried by the handle-section, the latch being adapted for engagement with a rack 61, carried by the frame, and the rear end of the arm 56, connected directly with the plow, is usually steadied by a short shaft 62, passed through it, as shown in Fig. 1, which may also serve as a pivotal connection between the two members of the lift-lever, it being understood that the two sections of the lift-lever are so constructed that the handle-section cannot be carried upward beyond the plane of the body-section, but is free to drop downward at an angle therefrom after the lever in its entirety has been carried upward to adjust the plow.

A covering device is employed, consisting, preferably, of two blades 63 and 64, as shown in Fig. 1, of angular construction and placed in such manner that the concaved surfaces of the two blades will face one another, one of the blades being carried farther to the rear than the other, so that their bent portions will be diagonally opposite, and each blade 63 and 64 is provided with a forwardly-extending arm 65, the said arms being pivoted to the forward portions of the frame, as illustrated in both Figs. 1 and 2.

The two blades of the furrow coverer or closer are connected by a cross-bar 66, diagonally placed, and a link 68 is pivotally connected with the said bar, having sliding movement thereon, and with an arm 69, attached to a rock-shaft 70, journaled transversely beneath the frame, and operated by a lever 71 within convenient reach of any person on the platform or by one of the persons seated near the seed-dropping box.

At the rear of the machine a marker is located, which marker consists of a body-bar 72, which is pivoted to the central rear portion of the frame and is capable of being swung from one side of the frame to the other. The marking-bar 73 is adjustable upon the body-bar, being held in desired position by a set-screw 74 or the equivalent thereof, and the marking-bar, when carried to the side of the machine, is made to enter sockets 75, located one at each side at the rear, as illustrated in Figs. 1 and 2, and said sockets are usually closed, after receiving the bar, by means of a cap-block 76 and a set-screw 77. At the extreme outer end of the marking-bar 73 the marker 78 is placed, and is of stellated shape.

The arms 65 project forwardly from the furrow-closer and are connected by a cross-bar 79, and the cross-bar is so placed that when the plow is carried upward a certain distance, or a distance, for example, which will carry it out of the ground, the coverer will not be lifted; but if said plow is then taken farther upward it will carry upward with it the furrow closer or coverer by contact with the said connecting-bar 79. Thus the plow can be manipulated independently of the furrow-closer, or both of them may be simultaneously operated. Under such a construction an exceedingly simple cane-planter is obtained, and one which is not only durable but economic, and which will insure the ready planting of cane, and whereby the cane may be expeditiously and conveniently fed to the cutters and cut to whatever length desired.

In Figs. 6, 7, and 8 I have illustrated slight modifications with reference to the planting or dropping box B and the knife, and in said figures the partition 25 has been omitted from the box; consequently it contains but a single compartment.

In the form of the device shown in Figs. 6 and 7 the arm 80, corresponding to the arm 36, (shown in the principal view Fig. 5,) is employed in like manner as the said arm 36, but at the top it is widened out to form two opposing cutters 81 made to face one another at an inclination, and as the arm 80 is reciprocated it is carried across the single opening 79 at the rear end of the box, and the knives 81 are alternately brought into action. The arm 80 is connected with a similar arm 82, located upon the inside of the box at its forward portion, and the said arm 82 at its upper end carries a platform 83 upon which the cane is laid, and as the arm 80 reciprocates the arm 82 is given a like motion, and the cane cut will drop from the platform 83, which is arched upon the top, and fall to the furrow.

In the form of the device shown in Fig. 8 the box is provided with two platforms or tables, similar to those shown and described in connection with Figs. 3, 4, and 5, and the tables are similarly dropped and similarly connected; but the arm 84, which is substituted for the arm 36, is pivoted at or near its center upon the end of the box, its upper end being provided with a knife 85, and a pin to trip the fingers operating the table. At the lower end of the arm 84 a slide is made, and the arm receives movement from a crank 87, operated from the upper or removable wheel or gear 46 of the train of gearing, or through other driving mediums.

The links of the plow are provided with a series of apertures 89. Thus the depth to which the plow may be lowered, or the height to which it may be raised, will be determined by the aperture that is brought in registry with and receives the pivot-pin of the lever 58. The downward movement of the plow may be limited by placing a pin in any one of the apertures in the links of the plow occurring above the frame of the machine.

Having thus described my invention, I claim as new and desire to secure by Letters Patent—

1. In a cane planter, a planting box provided with a removable partition and an opening at one of its ends divided by the said partition, the box being open at its lower end, a knife held to reciprocate across the open end of the box, and means, substantially as shown and described, for regulating the length of the cut cane, as and for the purpose specified.

2. In a cane planter, a planting box having an opening at one of its ends, the said end being inclined in direction of the opposite end of the box, a knife held to reciprocate across the opening in the box, a partition located within the box and extending up to the open portion thereof, the said box being provided with an opening at its lower end, and an interchangeable driving mechanism operating the said knife, as and for the purpose set forth.

3. In a cane planter, a planting box having an opening at one of its ends, and means for adjusting the length of the cane to be contained in the box, a knife held to reciprocate across the opening in the end of the box, doors located within the box and capable of transversely closing the same, trip devices carried by the door and operating from the knife, and means, substantially as shown and described, for reciprocating the knife, substantially as and for the purpose set forth.

4. In a cane planter, the combination, with the planting box adapted to receive cane, having a partition dividing it into compartments, and a knife reciprocating across both compartments, of a plow provided with fenders at its sides, the said fenders being located beneath the planting box, one at each side, the plow being connected with the forward end of the fenders, and a substantially inverted V-shaped share, whereby a furrow is made with two separate troughs, and whereby the cane from each compartment of the drop box will be deposited in an independent trough in the same furrow, as and for the purpose specified.

5. In a cane planter, the combination, with a furrow opener and a planting box located above the opener, provided with a reciprocating knife and means for driving the same, and devices for regulating the length of the cane to be cut, of a furrow closer located at the rear of the furrow opener, a lever connected with the furrow opener, through the medium of which the said opener may be raised or lowered independently of the furrow closer, or whereby the closer may be elevated with the furrow opener, and an independent lever controlling the movement of the furrow closer, as and for the purpose set forth.

ANTONIO MARTIN RIVERO Y AGUIAR.

Witnesses:
J. FRED. ACKER,
JED. YEREDER.